Patented June 21, 1949

2,473,818

UNITED STATES PATENT OFFICE 2,473,818

PROCESS OF PRODUCING RIBOFLAVIN

Allen S. Phelps, Orangeburg, N. Y., assignor, by mesne assignments, to American Cyanamid Company, New York, N. Y., a corporation of Maine No Drawing. Application December 29, 1945, Serial No. 638,469

4 Claims. (Cl. 195—35)

This invention relates to an improvement in the art of producing riboflavin. More particularly, the present invention is concerned with improvements in the method in which the fungus *Eremothecium ashbyii* is used to produce riboflavin by fermentation of a liquid, nutrient medium. The invention includes both the fermentation process and the new medium.

In the co-pending application of Henry D. Piersma, Serial No. 505,189, filed October 6, 1943, now United States Patent 2,400,710, issued May 21, 1946, a process is described and claimed by which good yields of riboflavin are produced in a liquid medium comprising water, an animal proteinaceous substance, malt extract, and sugar by the action of the organism *Eremothecium ashbyii*. Proteolytic digestion of certain of the proteinaceous substances, particularly liver cake, pancreas tissue, and the like, prior to fermentation results in further increases in the yield of riboflavin.

I have now found that small amounts of the glycerides of fatty acids exert a stimulating influence when added to a liquid medium comprising water, a proteinaceous substance, malt extract and sugar whereby the yield of riboflavin produced by the fungus *Eremothecium ashbyii* is very materially increased over that which would normally be obtained in the same medium without addition of the fatty acid glyceride. Although the increases in yield of riboflavin as a result of the addition of the fatty acid glyceride to the fermentation liquor will obviously vary with the particular medium employed, and other conditions of the process, increases in yield higher than 100% have been observed and increases of the order of 50% are a common experience in large scale commercial production.

The glycerides which have been found to give these surprising increases in riboflavin yields are esters of glycerol with various fatty acids. Most of the common fats and oils fall in this group of substances. The glycerol esters may be the mono-, di-, or tri-esters in which one, or more, of the alcoholic hydroxyl groups are esterified. The fatty acid component of the ester may range from acetic acid to those saturated and unsaturated fatty acids having up to about twenty-four carbon atoms. Among the specific fatty acid glycerides which have been examined by me and found to possess stimulating effects on the production of riboflavin may be mentioned glyceryl mono-oleate, glyceryl mono-stearate, tri-acetin, corn oil, cocoanut oil, cottonseed oil, olive oil, peanut oil, soy bean oil, cod liver oil, menhaden oil, butter fat, lard, liver fats, oleomargarine, Crisco, and others. Fatty acid glycerides, such as lecithin, have also been used with success to stimulate the production of riboflavin.

Better than normal yields of riboflavin are obtained when the medium contains as low as about ¼ of 1% by weight of glyceride. Increased riboflavin production is obtained with increasing amounts of glyceride, up to a maximum of about 1% by weight. Additional quantities of the glyceride do not appear to be advantageous and, in fact, when the amount of glyceride is further increased, decreasing yields of riboflavin are obtained so that when the medium contains more than about 2.5% by weight of glyceride the stimulating effect is scarcely observable. Obviously, I prefer to use the smallest amount of oil or fat consistent with maximum riboflavin production and, therefore, prefer to use from about 0.75 to 1.25% by weight of glyceride in the medium. One of the examples which will appear hereinafter illustrates the effects of varying amounts of oil.

The basal medium contains a proteinaceous material, malt extract, and a sugar. The proteinaceous material may be obtained from a number of sources including animal tissues, offal, liver, pancreas, kidney, liver cake (a by-product of vitamin manufacture from which most of the vitamins have been extracted), fish meal, distillers' slops, casein, peptone, soy bean meal, and other proteinaceous materials of animal or vegetable origin. These substances may, if desired, be given a preliminary digestion with proteolytic enzymes, as described in the co-pending application of Henry D. Piersma, Serial No. 572,747, filed January 13, 1945. In some cases, particularly when using animal tissue such as liver cake, the digestion with enzymes results in an improvement in the medium. In other cases, as when using casein and fish meal, proteolytic digestion does not seem to be beneficial.

The proteinaceous material used in the medium should vary from between about 0.5% to 5.0% by weight. Best results are sometimes obtained by the use of a narrower range of proteinaceous substance. For example, when using casein the preferred range is from about 0.8% to 1.0% by weight, although smaller or larger amounts may be used to advantage.

The malt extract employed in the medium is an article of commerce and consists essentially of a concentrated, aqueous extract of malted grain, such as barley. As will appear obvious, ground malt itself may be added to the mash in lieu of malt extract but such material is not ordinarily employed as it adds insoluble substances to the fermentation liquor. The presence of hop extracts, which are sometimes found in commercial malt extracts, are not deleterious and may, in fact, be advantageous adjuncts for the growth media. The amount of malt extract used in the medium may be varied from about 0.5 to 5.0% by weight (dry basis), the optimum amount appearing to be from about 1.4 to 1.8%.

The sugar used in the medium is preferably glucose or one of the cheap invert sugars or sugar syrups of commerce. Other sugar, such as sucrose, fructose, or mannose, lactose and galactose may also be used to supply the carbohydrate requirements of the medium. The term "sugar" as used hereinafter and in the claims does not include the maltose or dextrins of the malt extract. The amount of sugar in the medium is ordinarily within the range of 0.2% to 2.0% by weight, based on the total weight of the medium. The preferred range is about 0.3% to about 0.6%.

As previously indicated, the riboflavin-producing organism of the process is the fungus *Eremothecium ashbyii*. The fermentation of the nutrient liquor with this organism is carried out within the range of about 20° C. to 35° C., the preferred range being from about 30° to 32° C. The fermentation process is conducted at substantial neutrality, the pH of the mash being adjusted to within the range of 6.0 to 8.5 before sterilizing. Fermentation is preferably carried out between pH 6.5 and pH 7.5.

Inasmuch as the fungus *Eremothecium ashbyii* requires oxygen for satisfactory growth and production of riboflavin, it is necessary to aerate the medium during the fermentation process. This may be accomplished by growing the organism in an open vessel and exposing a shallow layer of the medium to air. In such a process the ratio of surface of medium exposed to the atmosphere in square centimeters to the volume of the medium in cubic centimeters should be at least 1.0.

A more practical way of fermenting large volumes of the liquor is to adopt the conventional practice of blowing a finely dispersed stream of air through a large volume of liquor contained in a tank. As this method of supplying air to aerobic organisms in deep tank cultures has been practiced for many years by the fermentation industry, detailed discussion would appear to be unnecessary. In general, however, the diffusers should have the smallest openings practical so that the air is finely dispersed through the medium. The air flow should be at least 0.25 cubic foot per minute per square foot per surface of the mash. Larger amounts of air are more desirable, preferably from about 1 to 2 cubic feet per minute per square foot of liquid surface. Under some circumstances mechanical agitation may be desired but ordinarily the agitation of the liquor caused by aeration will be sufficient.

The progress of the fermentation can be readily ascertained by withdrawal of samples from the fermentation vessel for analysis. The duration of the active phase of the fermentation is subject to considerable variation and may be as short as 60 hours or as long as 140 hours. Best results have been obtained in plant practice at around 90 to 100 hours.

The glycerides used are normally incorporated in the medium prior to fermentation and sterilized simultaneously with the other constituents. Although the oil will tend to collect at the surface of the medium when it is quiescent, aeration and agitation, which take place during the actual fermentation, keep the oil uniformly distributed throughout the medium in an emulsified condition.

Certain aspects of the invention will now be illustrated by means of the following examples.

EXAMPLE 1

In this example a basal medium comprising skim milk, malt extract, glucose and water was prepared. The various media contained 0.5% by weight of glucose (dry basis), 1.75% by weight of malt extract (dry basis), and the indicated amounts of skim milk and butter fat. Twenty-five milliliters of the medium was placed in 250 ml. Erlenmeyer flasks and sterilized for 30 minutes at 15 pounds steam pressure. The flasks were then inoculated with *Eremothecium ashbyii*, stoppered with a light cotton plug, and aerated by shaking for 88 hours in an incubator from 30° to 32° C. At the end of the fermentation period the liquor was withdrawn and analyzed for riboflavin. The results of this series of experiments are shown in the following table:

TABLE 1

*Variation of riboflavin yield with butterfat content of medium*

| Butterfat | Skim Milk | Malt Extract | Sugar | Riboflavin |
|---|---|---|---|---|
| Percent | Ml. | Percent | Percent | |
| 0 | 12.5 | 1.75 | 0.5 | 455 |
| .25 | 12.1 | 1.75 | 0.5 | 735 |
| .5 | 11.8 | 1.75 | 0.5 | 930 |
| .75 | 11.4 | 1.75 | 0.5 | 1,080 |
| 1.0 | 11.1 | 1.75 | 0.5 | 1,120 |
| 1.25 | 10.7 | 1.75 | 0.5 | 1,024 |
| 1.50 | 10.4 | 1.75 | 0.5 | 870 |
| 1.75 | 10.1 | 1.75 | 0.5 | 890 |
| 2.0 | 9.7 | 1.75 | 0.5 | 750 |
| 2.5 | 9.0 | 1.75 | 0.5 | 610 |

As will appear from the foregoing results, small amounts of butter fat exert a stimulating effect on the production of riboflavin but increasing amounts over an optimum level tend to decrease the riboflavin production.

EXAMPLE 2

In another series of experiments the stimulating effect of various glycerides was examined. The basal medium contained 1.75% (dry basis) of malt extract, 0.5% by weight (dry basis) glucose, and 1% of solubilized casein. The casein used was a commercial grade of casein which was solubilized by treating a 10% aqueous suspension for one hour at 45° to 50° C. with 0.7 ml. of 26% ammonia for each 10 grams of casein. Various oils were added in the amounts indicated in the table, the medium was then sterilized, inoculated with *Eremothecium ashbyii* and incubated as in Example 1. The results of these tests were as follows:

TABLE 2

*Effect of various oils on riboflavin production*

| Oil | Per cent | Average Riboflavin | Percent of Butterfat Stimulation |
|---|---|---|---|
| None | | 420 | |
| Butterfat | 1.25 | 1,200 | |
| Corn | 1.0 | 1,050 | 80 |
| Cotton | 1.0 | 895 | 60 |
| Soybean | 1.0 | 940 | 65 |
| Peanut | 1.0 | 895 | 60 |
| Cocoanut | 0.6 | 810 | 49 |
| Crisco | 1.0 | 930 | 65 |
| Oleomargarine | 1.0 | 895 | 60 |
| Cod liver | 0.8 | 830 | 52 |
| Menhaden | 1.0 | 855 | 55 |
| Lard oil | 0.8 | 1,050 | 80 |
| Lecithin | 0.8 | 830 | 82 |

Although butter fat showed the best results in the amount used it will be noted that all of the other glycerides resulted in the production of riboflavin far in excess of that of the control.

EXAMPLE 3

The stimulating effect of various glycerides on the riboflavin production in media containing different types of proteinaceous substance was also determined. In these tests, the results of which are shown below, the fish meal, peptone and distillers' solubles were used as received. The distillers' solubles was a water-soluble substance obtained by filtration and concentration of distillers' slops and contained a relatively high percentage of proteinaceous material. The liver cake, which was a by-product from which water-soluble substituents had been extracted, contained approximately 60% crude protein. This material was digested with 1% by weight of a proteolytic enzyme at 37° C at a pH of 9.5 for about three hours prior to its use in the process. The casein was a commercial grade of casein which had been solubilized with ammonium hydroxide as in the preceding example. In each case the medium was adjusted to a pH of about 6.5 to 7.0, sterilized, inoculated, and incubated as in the preceding examples.

TABLE 3

*Stimulation of riboflavin yield on various media by glycerides*

|  | Basal | Cream | Corn Oil | Peanut Oil |
|---|---|---|---|---|
| Fish Meal, 3% | 815 | 1,295 | 1,120 | 1,095 |
| Peptone, 2% | 290 | 375 | 440 | 430 |
| Distillers Solubles, 5% | 560 | 985 | 1,040 | 985 |
| Liver Cake, 3% | 410 | 830 | 815 | 1,065 |
| Casein, 1% | 530 | 960 | 1,015 | 930 |

Although the various basal mashes yielded widely different amounts of riboflavin it will be seen that each of the glycerides employed in the tests stimulated production of riboflavin to a high degree.

I claim:
1. A process of producing riboflavin which comprises inoculating a liquid medium comprising water, a proteinaceous substance, 0.5 to 5% of malt extract, 0.2 to 2.0% by weight of sugar, and from 0.25 to 2.5% by weight of glyceride of a fatty acid with the fungus *Eremothecium ashbyii* and fermenting the said medium.

2. A process of producing riboflavin which comprises inoculating a liquid medium comprising water, 0.5 to 5.0% by weight of a proteinaceous material, 0.5 to 5% of malt extract, 0.2 to 2.0% by weight of glucose, and from 0.25 to 2.5% by weight of glyceride of a fatty acid with the fungus *Eremothecium ashbyii* and fermenting the said medium.

3. A process of producing riboflavin which comprises inoculating a liquid medium comprising water, 0.5 to 5.0% by weight of casein, 0.5 to 5.0% of malt extract, 0.2 to 2.0% by weight of glucose, and from 0.75 to 1.25% by weight of the glyceride of a fatty acid with the fungus *Eremothecium ashbyii* and fermenting the said medium.

4. A process of producing riboflavin which comprises inoculating a liquid medium comprising water, a proteinaceous substance, malt extract, a sugar, and from 0.25 to 2.5% by weight of a glyceride of a fatty acid with the fungus *Eremothecium ashbyii* and fermenting the said medium at a temperature within the range between 20° and 35° C. for a period of time between 60 hours and 140 hours while aerating the medium.

ALLEN S. PHELPS.

REFERENCES CITED

The following references are of record in the file of this patent:

UNITED STATES PATENTS

| Number | Name | Date |
|---|---|---|
| 2,128,845 | Myers | Aug. 30, 1938 |
| 2,374,503 | Rudert | Apr. 24, 1945 |
| 2,400,710 | Piersma | May 21, 1946 |